June 26, 1945.    J. G. SHONTS ET AL    2,379,194
TRANSPARENT CLOSURE MOUNTING
Filed Jan. 9, 1942
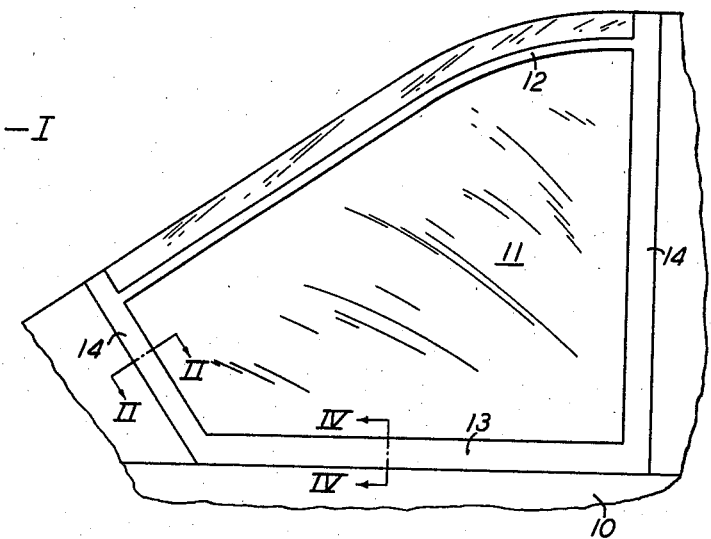
FIG-I
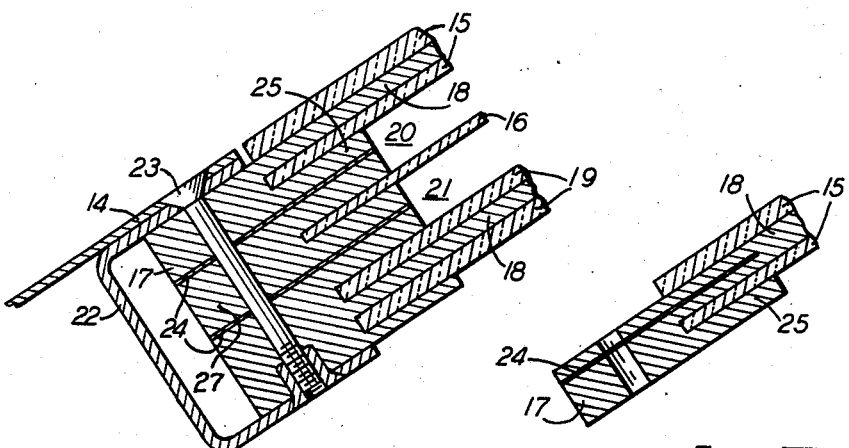
FIG-II
FIG-III
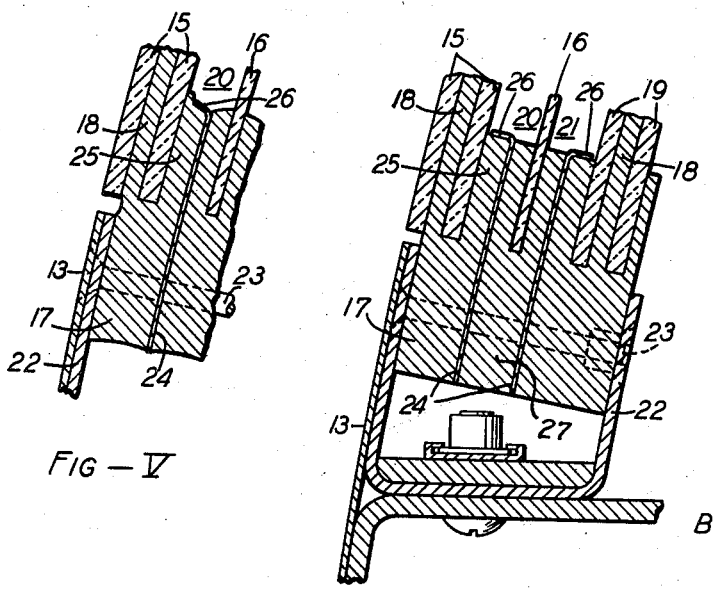
FIG-IV
FIG-V
INVENTORS
JAMES G. SHONTS
JAMES B. PRAY
BY
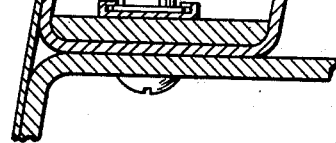
ATTY.

Patented June 26, 1945

2,379,194

UNITED STATES PATENT OFFICE 2,379,194

TRANSPARENT CLOSURE MOUNTING

James G. Shonts, Glendale, and James B. Pray, North Hollywood, Calif., assignors to Lockheed Aircraft Corporation, Burbank, Calif.

Application January 9, 1942, Serial No. 426,214

10 Claims. (Cl. 20—56.5)

This invention relates to transparent closure mountings for glazing units, and has particular relation to glazing units that can be sealingly and flexibly mounted in various locations subjected to shocks, stresses, distortion or weaving of the supporting structure, temperature and pressure differentials, etc.

In mounting laminated or safety glass under such conditions of severe usage it has heretofore been the practice to mount the edges of the glass laminations in resilient rubber channels which are clamped in a suitable mounting structure in an effort to both support and seal the glass in place. However, such a mounting is inadequate to seal the glazing unit against leakage or seepage about the edges thereof, especially when the supporting structure is not rigid in itself, as in the case of vehicles, boats and airplanes. Such twisting, weaving, or distortion of the mounting structure imposes unpredictable localized strains in the glazing unit which may of themselves be sufficient to break or crack the glass before any operating or design load is applied thereto. Also, when the glazing unit is subjected to differential pressures the unit must be very heavy to support the pressure in bending, whereas if the pressure and expansion stresses can be converted into tension in the material of the glazing unit a much lighter unit will carry the pressure load. It is accordingly an important object of this invention to provide an improved and strengthened mounting for laminated transparent closures wherein the tension loads on the closure can be carried into the laminating or interlayer material while at the same time restraining undue stretching or displacement thereof.

It is a further object of this invention to provide an improved and strengthened glazing unit of the multiple paned type wherein a series of hard transparent panes are bound together, at least adjacent their margins, by interlayers of suitable organic plastic which project beyond the edges of the panes, suitable relatively inextensible reinforcing material being embedded in said interlayers about the edges of the panes and extending inwardly therebetween for a sufficient distance to convert tension loads in the projecting marginal portions of the interlayers into shear forces in the interlayers between the reinforcement and the panes of hard material.

It is another object of this invention to provide a multiple laminated transparent enclosure wherein at least one insulating airspace, between glazing units, is provided by means of marginal interlayers of organic plastic material built up and bonded to the interlayers between the panes of the laminated glazing units and overlapping the edges of the glazing units to provide clampable means for mounting in fluid tight relationship without imposing clamping forces of any kind on the panes of the laminated closure. It is also an object of this invention to provide an improved glazing unit of the laminated type having projecting margins of interlayer material wherein the projecting interlayer material is subject to tension but is protected against excessive stretching or permanent distortion and creep by a metallic or relatively inextensible insert bonded into the interlayer, and transmitting such tension loads in the plane of the closure, without interfering with the sealing of said projecting interlayer in the mounting provided for the glazing unit.

It is a further object of this invention to provide and improved laminated glazing unit in which insulating air spaces are provided by built-up marginal portions of the interlayer material which marginal portions serve as a medium by which the unit can be mounted in various structures.

Other and further important objects of this invention will be apparent from the disclosures in the specification and the accompanying drawing.

In the manufacture of glazing structures in which an effective sealing must be insured, considerable difficulty has been encountered because of the action of clamping elements which heretofore necessarily have been applied to the marginal portions of the glass. Supporting frames including relatively soft cushioning strips have been employed, but despite such cushioning elements considerable clamping forces are necessary and these imposed strains upon the glass which would render it very susceptible to breakage. These disadvantages were greatly magnified when the unit was applied to frames in the type of vehicles which are subjected to torsional stresses or in aircraft wherein the frames are light and relatively flexible.

According to this invention interlayer material of organic plastic is extended from the laminated glass edges to provide a mounting border designed to be clamped directly in supporting frames. Vinyl acetal resin has been found to be satisfactory for use as interlayer material and is of such character as to be yieldable in response to clamping action. This resin lends itself efficiently to the construction of fluid-tight and strong connections between the glass and frame.

The interlayer material is sufficiently yieldable and resilient to insure a flexible and sealed mounting of the glass and various distortions and/or manufacturing variations in the supporting frame do not adversely affect the glass. Reinforcing material inserted and bonded in the marginal portions of the interlayer material extend inwardly between the edges of the glass to transmit tension loads to the glass edges by means of shear loads in the intervening interlayer material. The strength of the unit is thus greatly superior to previously-known units and this is of great importance in the provision of windows for aircraft to be employed in high altitude flights; for example, where relatively great differential pressures are necessary in order to maintain proper atmospheric conditions for passengers in the airplane.

This invention in its preferred form is illustrated in the drawing and hereinafter more fully described.

In the drawing—

Figure I is a fragmentary side elevation of an airplane windshield to illustrate a glazing unit embodying the features of this invention.

Figure II is a section on the line II—II of Figure I showing one form of triple glazing wherein reinforcing material prevents undue distortion of projecting margins of the built-up interlayer material forming both the mounting and spacing means for the glazing units.

Figure III is a modification of Figure II, wherein the reinforcing material is embedded in the interlayer bonded between laminations of the glazing unit.

Figure IV is a section on the line IV—IV of Figure I showing the edge mounting of the glazing unit as adapted to take tension loads on the unit due to differential pressure acting thereon.

Figure V is a fragmentary section corresponding to Figure IV and showing in exaggerated form the relative movements caused by tension loads on the joint.

As shown in the drawing:

In disclosing this invention as applied to an airplane fuselage 10, and its windshield 11, it is to be clearly understood that in its broader aspects the invention is not limited to such use, but such glazing units may be used in display cases, refrigerators, pressure and vacuum chambers, port holes, automobiles, etc. Also, while laminated glass will be described as particularly adapted to the practice of the invention, it is to be understood that glazing units broadly refer to transparent panels including materials other than glass. For example, hard resins of the acrylic plastic type may be used for the opposite surfaces of one or more of the units, while the marginal portions are maintained sufficiently flexible and resilient to be susceptible to edge clamping and reinforcement by inserted material. It is also possible to use this type of reinforced and built-up interlayer in connection with transparent hard resins substituted for the sheets of glass. If glass is to be used under severe conditions it would be preferable to use the semi-tempered variety because of its greatly increased strength, it being generally considered to have a tensile strength of 20,000 pounds per square inch as compared to 6,500 pounds per square inch for annealed plate glass.

Because of practical difficulties in forming and laminating plate glass to double curvatures, the windshield 11 is shown as broken up into three sections by longitudinal members 12, the windshield panels being mounted in hoop tension along the longitudinal edges thereof; such a tension mounting being preferably formed as in Figure IV. The front and rear edges 14 of the windshield do not require other than flexible edge sealing as in Figure II, as the entire windshield is intended to breathe relative to the fuselage 10 by changes in the curvature thereof. For example, contraction due to low temperatures would tend to slightly flatten the transverse or cross sectional curve of the windshield.

In airplane service installation it may be noted that the windshield must withstand surface temperature variations from minus 50 degrees to plus 150 degrees in the time it takes to descend from a high altitude to a hot desert location. The latter figure has even been exceeded upon continued exposure uunder a hot sun. Since the cockpit temperatures cannot be allowed to approach the lower limit it is necessary to carry a high temperature differential which means susceptibility to frosting and fogging of the windshield. Accordingly Figures II and IV show what may be called a triple glazed unit wherein an outer laminated glass section or panel including panes 15 bonded together by an interlayer 18 which includes a border portion extending beyond the margins of said panes and a layer 25 overlying the inner face of one of the panes 15, is spaced from a thin central sheet or section 16 having its marginal edges received in a border portion 27. The border portion 27 may be separately bonded to the central sheet 16, prior to the assembly thereof in the finished triple glazed unit. A similar laminated glass section or panel including panes 19 is disposed on the inner side of the windshield, and is bonded together and spaced by the same type of interlayer material as the panes 15 to provide hermetically sealed air spaces 20 and 21 on either side of the central sheet 16. The thickened marginal portions of the interlayers 18 and the portion 27 provide a border portion generally indicated by the numeral 17. The plastic material of the border portion 17 serves as a mounting rim and also as spacer means for the several windshield sections.

It will be convenient to first consider the tension mounting of Figure IV in detail. The sections 18, 18 and 27 of the built-up thick projecting marginal border 17 are bolted at intervals in a channel 22 which in turn is secured to the fuselage 10 along the sides 14 of the windshield opening. In order to prevent the bolts 23 from stretching and distorting the plastic border material, one or more relatively thin and flexible but relatively inextensible reinforcing members 24, preferably of sheet material such as aluminum, or alloys thereof, is bonded between the border portions of the interlayer material 18 and the border portion 27 with the reinforcing members 24 extending inwardly beyond the edges of the panes 15—15, 16 and 19—19 comprising the transparent material. Thus the reinforcing material 24 extends from edge to edge of the border portion 17 and in overlapping relation to the edges of the panes 15—15, 16 and 19—19 so that tension stresses in the border portion 17 are transmitted through the reinforcing material 24 into shear stresses in the portions of the border overlapping the sides of said panes. Since this reinforcement can be readily bonded to the interlayer material, in the same way that the interlayer material can be bonded to glass, the layer 25 of the material 18 is positioned between the reinforcing member and the inner glass panes of the outer and inner laminations 15 and 19, and is subject to shear forces when tension or compression is applied in the plane of the windshield, since it is bonded between the facing surfaces. In order to further strengthen the effect of the reinforcing material 24 its inner edge may be turned over as at 26 to provide a bearing surface on the inner edge of the layer 25.

Figure V illustrates, in exaggerated form, the deformation resulting from tension stresses applied in the plane of the windshield. It will be noticed that the plastic layers 18, 27, 18 comprising the border 17 stretch, while the reinforcement 24 applies a shear load to the innerlayer material at 25, and the turned over edge 26 of the reinforcement displaces the inner edge of the material 25, causing a plastic flow therein as well as a slight distortion of the bond 26. The preferred type of interlayer material is capable of recovering its original form upon release of the stress imposed thereon.

Figure II is intended to represent the non-tensioned edges of the windshield and differs from Figure IV only in omitting the bent edges 26 of the reinforcement material 24. It will be understood that the material 24 may be formed either as separate strips for each edge of the windshield or as a continuous border with a suitable central cut out. Also, the form of reinforcement in Figure II is adequate to carry the tension load in less exacting installations than in airplanes, as when so loaded stretching of the marginal interlayer material would produce shear stresses in the material 25 to supplement the inherent tension resistance of the interlayer material itself.

Figure III shows a variation of Figure II wherein the reinforcing material is positioned in the interlayer 18 between two panes of hard surfacing material 15 such as glass or glass substitutes. Such an arrangement, with or without the overlying interlayer material 25, could be used by itself as a single laminated closure, or could be combined with other units to produce one or more air spaces, as described hereinbefore.

The synthetic resin plastic which is employed for laminating or binding the glass layers and forming an integral protruding edge to serve as a gasket can be in the form of a vinyl acetal derivative, preferably a polymerized vinyl butyral resin. Such material is translucent before bonding between the glass layers and becomes of water-white transparency after bonding.

The plastic per se, forms no part of the present invention and is commercially available under the general trade name of "Vinal" derived from vinyl butyral.

Vinyl butyral itself, it is understood, may be made by treating a mixture of vinyl acetate and vinyl alcohol with butyraldehyde, and plasticizing the resulting resin by admixture of triethyleneglycol dihexoate. It is further understood, that an example of suitable proportions to produce the desired gasket-like combination of mechanical strength, flexibility, resiliency, and compressibility or flowability comprises a mixture of approximately 20% vinyl acetate and 80% vinyl alcohol treated with butyraldehyde, the resulting resin having about 30% of the total triethylene glycol added to plasticize the mass. The plasticized mass is then calenderd or otherwise treated to reduce the same to suitable sheet form.

While the bond between the marginal interlayers 18, 27, 18, the glass panes 15—15, 16, and 19—19, and the reinforcing material 24 is ordinarily sufficient, an improvement or refinement in adhesion over such smooth surfaces could be obtained by etching or sandblasting the glass margins, and knurling or serrating the reinforcing material.

In fabricating a so-called triple glazed unit of the type herein, wherein sealed air spaces are provided, it becomes necessary to initially separately fabricate the separate laminated members 15 and 19, as well as the central pane 16. It is convenient to use either the central glass surface 16 or the reinforcing material 24 as temporary parting planes, so that in assembling the outer laminations 15 for example, the glass panes are assembled with an interposed sheet of interlayer material 18 which interlayer material is built up around the margins of the inner glass to form border portions including the layer 25, which defines part of the air space 20. The reinforcing material and half the overlying interlayer material 27 is then applied, in the case where the parting plane is the central pane 16, and a suitable form defining the air space is inserted inside the edges of the material 25 to prevent flow thereof during the bonding operation. The remaining exposed areas of the marginal interlayer extensions are masked by non-adhesive sheet material, such as Cellophane or other inert masking material.

The assembly is placed in a rubber bag from which air is evacuated. The several elements in the bag are then placed in an autoclave and therein subjected to heat of approximately 220 degrees F., under fluid pressure of approximately 150 pounds per square inch. The several elements of the laminated unit are thus bonded into a composite closure unit. The closure unit can also be fabricated by placing molding frames around the assembled glass sheets and plastic interlayers wherein the interlayer extensions are masked and then the assembly is subjected to sufficient heat and pressure at values indicated above to effect proper bonding. At the same time the frames provide for maintaining proper shape of the extension at a desired thickness.

When the components 15 and 19 of the composite windshield have been assembled and bonded, the center panel borders 27, if not already bonded in the preceding operation to the reinforcing material 24, are then bonded to said material by applying a suitable cement to the facing surfaces. If the center panel borders 27 have been initially bonded to the material 24, then cement will be applied to the exposed side surfaces thereof and the corresponding surfaces of the central panel 16. In cementing polyvinyl plastic resins of the type referred to herein, it is usually desirable to use a liquid monomer in which some of the desired polymer has been dissolved, together with the necessary amount of catalyst. After coating the surfaces to be joined the joint is held under pressure until a preliminary set is obtained and then the cemented joint is exposed to sun light or its equivalent to complete the polymerization of the cement.

In the use of this invention the gasket-like integral rim can yield locally under clamping pressure to any irregularities in the clamping means, as well as to absorb the severe stresses, shocks, strains and twists to which airplane structures are subjected in use without causing breakage of the glass. The gasket-like rim is also capable of sealing openings in a supercharged cabin without requiring excessive clamping pressures to be imposed upon said rim or on the glass itself.

It will be understood that the particular plastic disclosed herein may be replaced by other materials having the same desirable characteristics as set forth and that structural changes may be made in the mounting means shown herein without departing from the spirit of the invention or the scope of the appended claims.

Having thus described our invention and the present preferred embodiments thereof, we desire to emphasize the fact that many modifications may be resorted to in a manner limited only by a just interpretation of the following claims.

We claim as our invention:

1. A windshield construction comprising a plurality of spaced sections having an intervening air space therebetween, at least one of said sections being laminated and including external layers of hard transparent material with an interlayer of plastic material bonding the same together, said interlayer extending beyond the marginal edges of said hard transparent material to provide a mounting rim, the extended portions of said plastic interlayer being built up to a substantially greater thickness than the hard transparent material on at least one side of said laminated section and extending inwardly in overlapping relationship upon the marginal portions of one of said layers of said hard transparent material to provide a border portion spacing said sections apart, and reinforcing sheet material bonded to said border portion and extending parallel to the plane of the section, said mounting rim and said reinforcing sheet material having openings for the reception of fastening elements, whereby when in use tensile stress in the mounting rim is transmitted into shear stress in at least the border portion bonded between the reinforcing material and said one layer of hard transparent material.

2. A laminated windshield construction comprising external layers of hard transparent material with an interlayer of plastic material bonding the same together, said interlayer extending beyond the marginal edges of said hard transparent material to provide a mounting rim, the extended portions of said plastic interlayer being built up to a substantially greater thickness than the hard transparent material on at least one side of said windshield and extending inwardly in overlapping relationship to the marginal surface of the hard transparent material on said one side of said windshield, and reinforcing sheet material bonded within said built-up marginal interlayer material and extending parallel to the plane of the panel, the inner edge of said sheet material being bent over and engaging the inner periphery of the inwardly extending portion of said marginal interlayer material, whereby to transmit tensile stresses in the mounting rim into shear stresses in the interlayer bonded between the reinforcing material and said marginal surface of said hard transparent material.

3. A windshield construction comprising a plurality of superimposed spaced panels defining intervening insulating air spaces, the outer panels being laminated and each comprising transparent sheets of hard material and an interlayer of plastic material bonding the same together, said interlayer extending beyond the marginal edges of said hard material and being of greater thickness than, and overlapping the marginal edge of, the hard material on one side of the interlayer, the thickened portions of said marginal interlayers being disposed in confronting relation and projecting above the plane of the surface of the adjacent hard material, whereby to provide means spacing said panels apart, and sheet reinforcing material bonded to said marginal interlayer material in the plane of each of said air spaces and arranged in overlapping relationship to the edges of said transparent sheets of both panels.

4. A laminated windshield construction comprising transparent sheets of hard material with an interlayer of plastic material bonding the same together, said interlayer extending outwardly beyond the marginal edges of said hard material to provide a mounting rim and including a portion extending inwardly and overlapping the marginal portions of at least one of said sheets to define a thickened border portion, and sheet metal reinforcing material bonded within said thickened border portion and extending parallel to the plane of said hard material and from edge to edge only of said thickened border portion.

5. A windshield construction comprising a plurality of spaced panels defining intervening insulating air spaces, the outer panels each comprising transparent sheets of hard material laminated with an interlayer of plastic material bonding the same together, said interlayer extending beyond the marginal edges of said hard material and having a border portion of greater thickness than the sheet of hard material on at least one side of the interlayer, whereby to project above the plane of the surface of said hard material, and parting means comprising sheet material interlayed between successive border portions of said plastic material and so constructed and arranged as to form parting planes in the planes of said air spaces, whereby to permit separate assembly and bonding of the outer laminated panels.

6. A triple glazed windshield construction comprising outer laminated panels spaced from a central single panel whereby to provide airspaces on either side of the latter, each of said laminated panels comprising hard transparent panes and an interlayer of plastic material bonding the same together, said interlayers extending beyond the marginal edges of said panes and being built-up around said margins to form spacers defining the airspaces between said central single panel and the outer laminated panels, and reinforcing material positioned in said marginal built-up portions of the interlayer material and so constructed and arranged as to transform tension or compression forces in the plane of the windshield into shear forces between bonded surfaces of said interlayer material.

7. A triple glazed windshield construction comprising outer laminated panels spaced from a central single panel whereby to provide airspaces on either side of the latter, said laminated panels each comprising hard transparent panes and an interlayer of plastic material bonding the same together, said interlayers extending beyond the marginal edges of said panes and being built-up around said marginal edges to form spacers providing the aforementioned airspaces between said central single panel and the outer laminated panels, and parting means comprising sheet material interlayed between adjacent layers of said marginal interlayer material and so constructed and arranged as to form parting planes in the planes of said air spaces, whereby to permit separate assembly and bonding of the outer laminated panels.

8. A triple glazed windshield construction comprising outer laminated panels, each comprising hard transparent panes and an interlayer of plastic material bonding the said panes together, said interlayers extending beyond the marginal edges of said panes and being built-up around said marginal edges and extending inwardly upon the marginal surface of said panes to provide a border portion on at least one side of said laminated panels, an intermediate panel comprising a transparent pane having a border portion of plastic material bonded thereto with the plastic material overlying the opposite marginal portions of said pane and cooperating with the border portions of said laminated panels to provide an air space between said intermediate and laminated panels; and sheet reinforcing material disposed between the border portions of said intermediate and said laminated panels and bonded to the plastic material comprising said border portions, the parts of said border portions and reinforcing material disposed outwardly beyond the periphery of said panes being adapted to be clampingly engaged to serve as a mounting rim.

9. A triple glazed windshield construction comprising: outer laminated panels, each comprising hard transparent panes and an interlayer of plastic material bonding the said panes together, said interlayers extending beyond the marginal edges of said panes and being built-up around said marginal edges and extending inwardly upon the marginal surface of said panes to provide a border portion on at least one side of said laminated panels, an intermediate panel comprising a transparent pane having a border portion of plastic material bonded thereto with the plastic material overlying the opposite marginal portions of said pane and cooperating with the border portions of said laminated panels to provide an air space between said intermediate and laminated panels; sheet reinforcing material disposed between the border portions of said intermediate and laminated panels and bonded to the plastic material comprising said border portions, the parts of said border portions and reinforcing material disposed beyond the periphery of said panes serving as a mounting rim; and clamping means for said windshield, including means engaging the opposite sides of said mounting rim and fastening elements extending through said mounting rim, whereby tensile stresses in said mounting rim are transmitted by said reinforcing material into sheer stresses in the border portions disposed between the panes of said intermediate and laminated panel sections.

10. A windshield construction comprising, a plurality of spaced sections having an intervening air space therebetween, at least one of said sections being laminated and including external layers of hard transparent material with an interlayer of plastic material bonding the same together, said interlayer extending beyond the marginal edges of said hard transparent material to provide a mounting rim, the extending portions of said plastic interlayer being built up to a substantially greater thickness than the hard transparent material on at least one side of said laminated section and extending inwardly in overlapping relationship upon the marginal portions of one of said layers of said hard transparent material and being bonded thereto to provide a border portion spacing said sections apart, and reinforcing sheet metal material bonded to said border portion and extending parallel to the plane of the section, said mounting rim and said reinforcing sheet metal having openings for the reception of fastening elements, whereby when in use tensile stress in the mounting rim is transmitted into shear stress in at least the border portion bonded between the reinforcing material and said one layer of hard transparent material.

JAMES G. SHONTS.
JAMES B. PRAY.